D. W. BRODNAX, Sr.
ROTARY SPADE-CULTIVATOR.

No. 170,661.   Patented Dec. 7, 1875.

UNITED STATES PATENT OFFICE.

DAVID W. BRODNAX, SR., OF ROCKDALE, TEXAS.

IMPROVEMENT IN ROTARY SPADE-CULTIVATORS.

Specification forming part of Letters Patent No. 170,661, dated December 7, 1875; application filed September 20, 1875.

*To all whom it may concern:*

Be it known that I, DAVID W. BRODNAX, Sr., of Rockdale, in the county of Milam and State of Texas, have invented certain new and useful Improvements in Rotary Spade-Cultivators; and I do hereby declare the following to be a full, clear, and exact description of the invention, such as will enable others skilled in the art to which it pertains to make and use it, reference being had to the accompanying drawings, which form part of this specification.

My invention relates to rotary cultivators; and consists of a rotary spade-cultivator secured to a frame, which is attached to a truck or the rear of a vehicle, said revolving spade-wheel adapted by a peculiar arrangement of supports and lever to be lifted from the ground, or forced down therein, as hereinafter more fully set forth and claimed.

Figure 1:
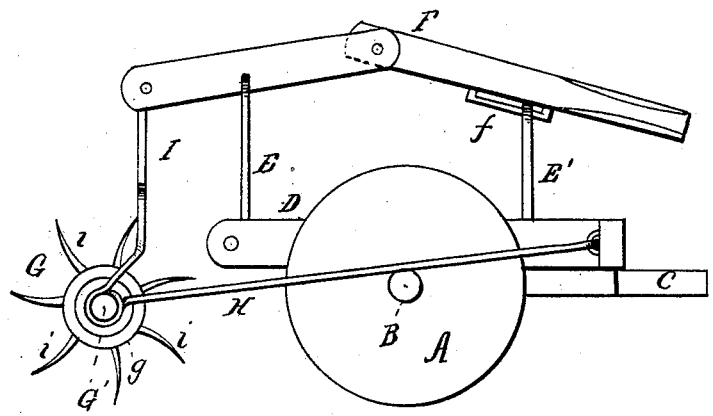
Figure 2:
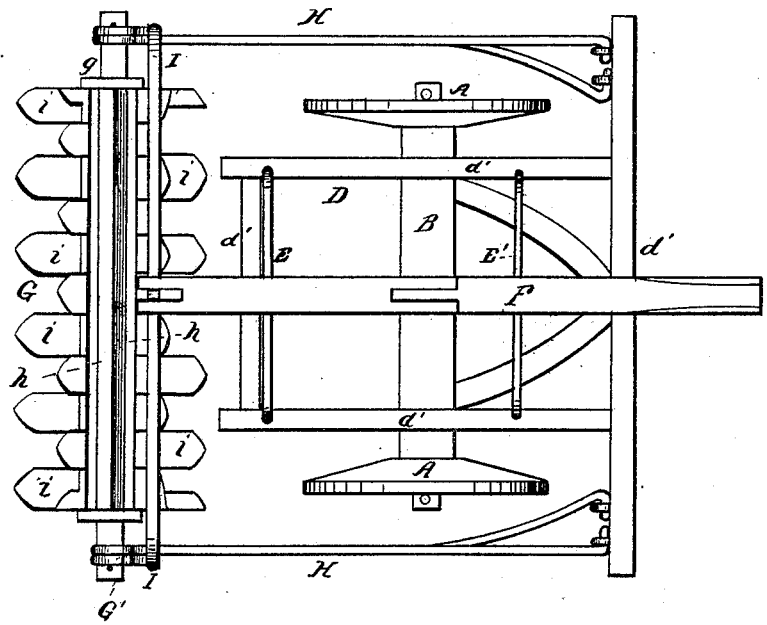

In the drawings, Figure 1 is a side elevation of my invention as secured to a wagon or truck; and Fig. 2, a plan view of same.

A A are the ordinary rear wheels of a vehicle, B the axle, and C the reach; or these parts A B C may be a truck, or the front wheels, axle, and shaft or coupling-pole of a vehicle. Supported on this axle B is a frame, D, composed of two end and two side bars, $d$ $d'$, the front bar projecting laterally in front and on each side beyond the wheels A. Secured upon this frame D are two supporting braces, E E', which form the bearing for the operating lever, and the frame or bed on which to place the necessary weight to force the blades into the earth. F is the operating lever, composed of two parts hinged together, and secured to the front brace E' by a yoke, $f$, and pivoted to the rear brace E, which passes through it. G is the rotary wheel-cultivator, placed at the rear of the truck and secured thereto by rods H, attached to each end of the shaft of the wheel, and to the outside ends of the front bar of the frame D. I is a yoke, attached at each end to the outside ends of the shaft of the wheel G, and at the central portion to the end of lever F. This cultivating-wheel G is composed of two end heads, $g$ $g$, secured to the ends of a shaft, G', which passes through the center of the same, and projects a short distance at each side. Secured to these heads, at proper distances around its periphery, are rods or bars $h$ $h$, to which the spades or cultivator-teeth $i$ are secured.

The operation of this device is apparent. As it is drawn along over the ground the wheel G is caused to revolve by the action of the spades or teeth $i$ entering the ground, by which action of the teeth the ground is cut up and finely pulverized.

The object and the advantage of this cultivator over any cultivator of like character of which I am aware are that, by the open-work wheel all trash, stones, &c., lifted up by the teeth are allowed to fall through the wheel onto the ground, and not to lodge and clog up the wheels.

By means of the jointed lever the cultivator may be lifted entirely from the ground, or forced down thereon to any extent desired. At the same time that it breaks the ground, it cuts up all stalks, weeds, &c., thereon.

The frame is light and simple, and may be readily secured to the rear of a common farm-wagon.

Having thus described my invention, what I claim is—

1. The combination, with the frame D, with supporting-arches E E', of the compound lever F and yoke I, for raising the cultivator-wheel, as described.

2. The rotary spade-cultivator composed of frame D, supporting-arches E E', jointed hinged hand-lever F, yoke I, rods H, and wheel G, all constructed, arranged, and adapted to operate as and for the purpose described.

In testimony that I claim the foregoing I have hereunto set my hand this 21st day of July, 1875.

DAVID W. BRODNAX, SR.

Witnesses:
P. DOENICK,
WM. M. PENN.